(12) United States Patent
Frederick et al.

(10) Patent No.: US 7,893,998 B2
(45) Date of Patent: Feb. 22, 2011

(54) AUDIO OVER A STANDARD VIDEO CABLE

(75) Inventors: John W. Frederick, Spring, TX (US);
Christopher D. Voltz, Spring, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1607 days.

(21) Appl. No.: 11/192,614

(22) Filed: Jul. 29, 2005

(65) Prior Publication Data

US 2007/0024629 A1    Feb. 1, 2007

(51) Int. Cl.
*H04N 5/50* (2006.01)
(52) U.S. Cl. ............................................. 348/552
(58) Field of Classification Search ................. 348/552, 348/553, 725, 723, 21–24; 345/204, 213; 710/63, 69, 70
See application file for complete search history.

(56) References Cited

U.S. PATENT DOCUMENTS

| | | | |
|---|---|---|---|
| 6,314,479 B1 * | 11/2001 | Frederick et al. ............... 710/63 |
| 6,738,856 B1 * | 5/2004 | Milley et al. ................. 710/315 |
| 6,989,827 B2 * | 1/2006 | Myers ......................... 345/204 |
| 7,038,669 B2 * | 5/2006 | Myers ......................... 345/204 |
| 7,057,667 B1 * | 6/2006 | Mori et al. ................... 348/554 |
| 7,154,493 B2 * | 12/2006 | Yee ............................. 345/211 |
| 7,283,566 B2 * | 10/2007 | Siemens et al. .............. 370/486 |
| 7,706,692 B2 * | 4/2010 | Tatum et al. ................. 398/139 |
| 2003/0001829 A1 * | 1/2003 | Tanizoe et al. .............. 345/204 |
| 2004/0080523 A1 | 4/2004 | Myers |
| 2005/0162336 A1 * | 7/2005 | McClintock et al. .......... 345/1.1 |
| 2006/0089735 A1 * | 4/2006 | Atkinson ...................... 700/94 |
| 2006/0269056 A1 * | 11/2006 | Montag ........................ 380/205 |

* cited by examiner

*Primary Examiner*—Paulos M Natnael
(74) *Attorney, Agent, or Firm*—Kevin Hart

(57) ABSTRACT

A source unit has a video source, a digital audio source, a DDC/CI communications capability and a switch for coupling a pin of a standard video cable either to the digital audio source or to a non-audio conventional connection. A display device has a video consumer, a digital audio consumer, a DDC/CI communications capability and a switch for coupling the pin of the standard video cable either to the digital audio consumer or to a non-audio conventional connection. The switch in the display device is responsive to a DDC/CI command.

15 Claims, 2 Drawing Sheets

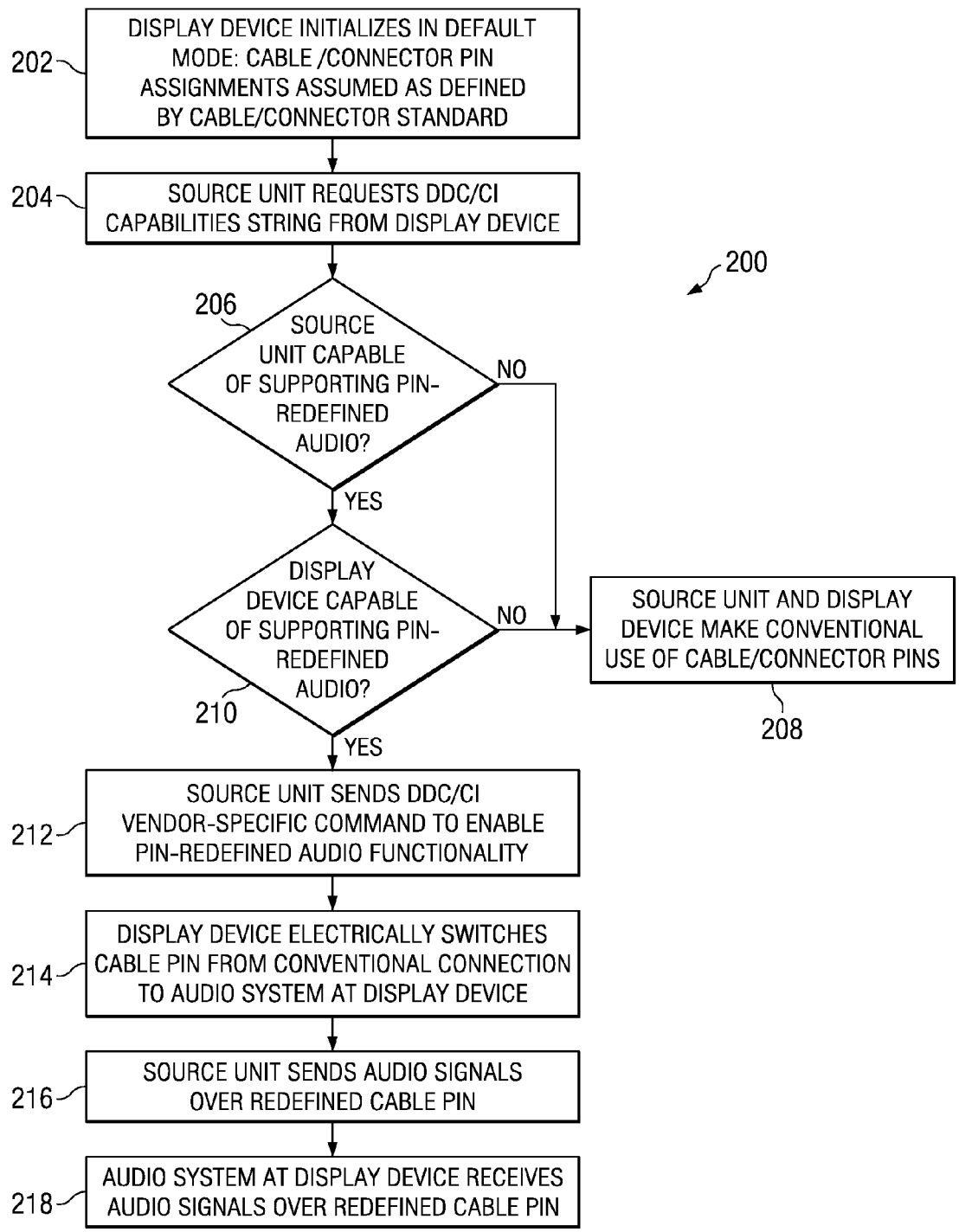

AUDIO OVER A STANDARD VIDEO CABLE

FIELD OF THE INVENTION

This invention relates generally to computer or media systems having a source unit coupled to a display device by a cable. More specifically, the invention relates to techniques for providing audio output at the location of the display device in such systems.

BACKGROUND

In computer or media systems having a source unit coupled to a display device by a cable, it has become desirable to provide audio output at the location of the display device. When this is achieved, the audio output may be presented to the user via one or more sound transducers that are typically integrated into the display device or otherwise placed in close proximity to the display device.

One known technique for providing audio output at the location of the display device is to use two separate cables between the source unit and display device-one cable for video signals and one cable for audio signals. For example, it is known to use one VGA ("Video Graphics Array") cable and pair of connectors to couple analog video signals and associated video timing signals from the source unit to the display device, and to use a separate non-VGA cable with its own pair or pairs of connectors to couple analog audio signals from the source unit to the display device. It is also known to use a DVI ("Digital Visual Interface") cable and pair of connectors to couple analog or digital video signals and associated video timing signals from the source unit to the display device, and to use a separate non-DVI cable with its own pair or pairs of connectors to couple analog audio signals from the source unit to the display device. Typically, two channels of audio are provided using the separate-cables technique, the left channel and the right channel. Although the separate-cables technique represents a straightforward solution, it is expensive because it requires two cables and at least two pairs of connectors, and it degrades the quality of the audio somewhat because the audio signals are transmitted in analog form.

Another known technique for providing audio output at the location of the display device is to follow the HDMI ("High-Definition Multimedia Interface") standard. The HDMI standard specifies a way of coupling digital audio and digital video signals between the source unit and display device in time-multiplexed fashion over a single cable and pair of connectors. An HDMI cable includes enough wires to support three different types of communication channels: TMDS ("Transition Minimized Differential Sampling"), DDC ("Display Data Channel") and CEC ("Consumer Electronics Control"). More specifically, an HDMI cable includes four shielded TMDS wire pairs. These four TMDS wire pairs are used to transmit digital video and timing signals from the source unit to the display device. These same four TMDS wire pairs are also used to transmit digital audio signals from the source unit to the display device during the horizontal and vertical blanking intervals of the video. To accomplish this, the HDMI standard specifies a new transport protocol that is superimposed on top of the older ("International Electrotechnical Commission") IEC 60958 and IEC 61937 digital audio transmission protocols (hereinafter the "IEC protocols").

According to the HDMI transport protocol, audio data being carried across the TMDS links does not retain the original audio sample clock that the IEC protocols provided. Instead, typically between one and four packets of audio data are transmitted over the TMDS links during every horizontal blanking interval, each of the packets carrying a payload of up to four subpackets, each of the subpackets carrying at most one IEC protocol frame or block of audio samples. The sound system associated with the display device must then continually recreate the audio sample clock and synchronize it with the video clock using HDMI-specified audio clock regeneration packets that are also transmitted across the TMDS links.

Because numerous audio encodings, sample rates and sample sizes are supported by the IEC protocols, it is necessary to set corresponding parameters for use between a given source unit and display device/audio system. According to the HDMI standard, the source unit uses the DDC channel in the HDMI cable to determine which audio encodings are supported by the display device's audio system. It does so by reading an HDMI-specified "vendor specific data block" from the E-EDID ("Enhanced Extended Display Identification Data") data stored in the display device. The source unit then dictates which parameters will be used for audio by setting appropriate bits in the IEC protocol packets and by sending HDMI-specified "audio infoframe packets" at frequent, HDMI-specified times.

One of the benefits of the HDMI standard is that it addresses the problem of audio quality degradation by transmitting digital audio signals instead of analog audio signals. The HDMI standard also eliminates the need for separate audio and video cables and pairs of connectors by time-multiplexing digital audio and digital video on a common set of TMDS wires. Unfortunately, HDMI implementations introduce significant manufacturing expense: The relatively elaborate HDMI cable and connectors are costly, and the encoding/decoding logic that is necessary to implement the HDMI protocol in the source unit and in the display device are complex. Moreover, because HDMI sends audio packets during video blanking intervals, the bandwidth available for audio in an HDMI implementation is limited by, and various in accordance with, the video timing of the display device and the source unit's graphics system. In addition, many display devices and source units that support the HDMI standard also support the VGA and/or the DVI standards for backward compatibility. Consequently, the expense of including VGA and DVI connectors is not avoided in such HDMI-equipped systems.

BRIEF DESCRIPTION OF THE DRAWINGS

FIG. 2 is a flow diagram illustrating a preferred method for providing audio output at the location of a display device in a suitably-configured system such as the system of FIG. 1.

DETAILED DESCRIPTION OF THE PREFERRED EMBODIMENTS

Figure 1:
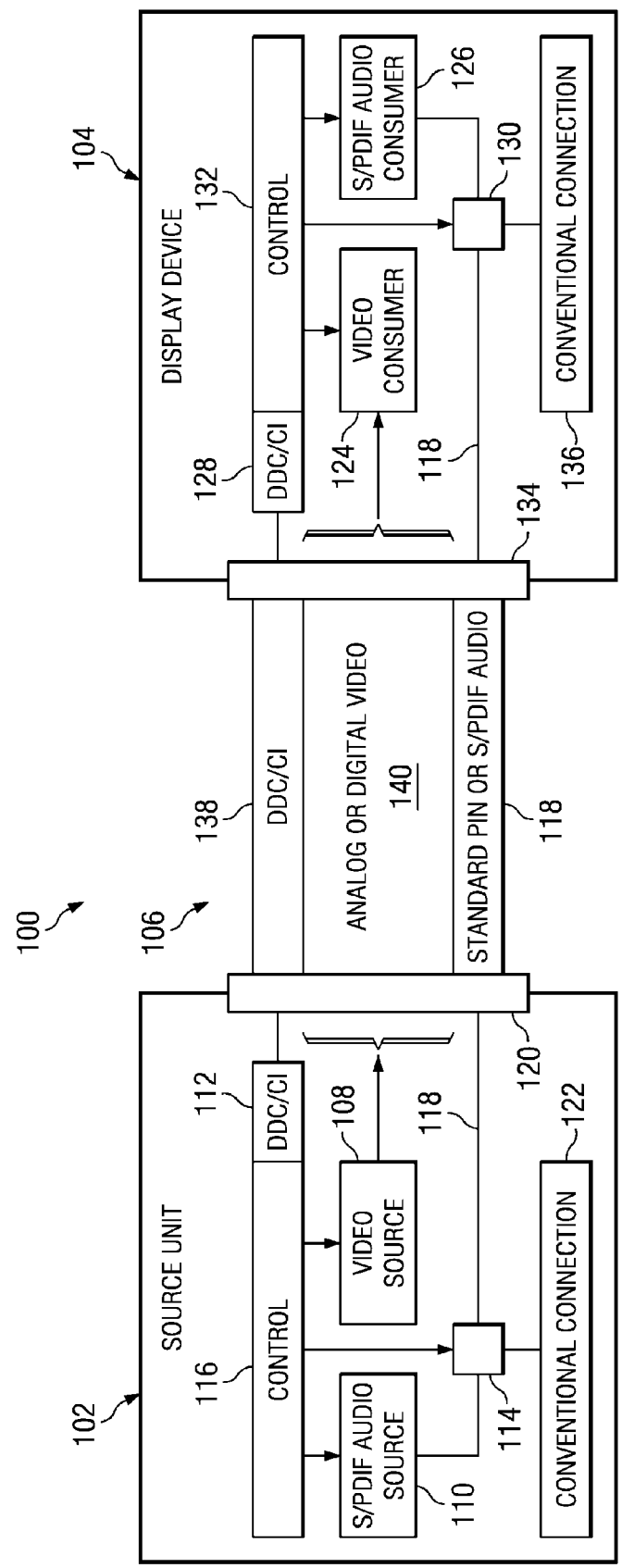
FIG. 1 is a schematic diagram illustrating a source unit and display device configured to provide audio output at the location of the display device according to a preferred embodiment of the invention.

FIG. 1 illustrates a system 100 according to a preferred embodiment of the invention. In system 100, a source unit 102 and display device 104 are coupled to one another by means of a standard video cable 106 and a single pair of connectors 120, 134. Cable 106 may be any standard video cable such as, for example, a VGA cable, a DVI cable or an HDMI cable. Connectors 120, 134 may be standard connectors corresponding to the standard of cable 106. Source unit 102 includes a video source 108, a digital audio source 110, a DDC/CI (Display Data Channel/Command Interface) communications capability 112 and a switch 114. Switch 114 may be controlled by a control unit such as control unit 116, and is configured to couple a pin or wire 118 of standard video cable connector 120 either to digital audio source 110 or to a non-audio conventional connection 122. Conventional connection 122 may be whichever connection is specified for pin or wire 118 by the standard that defines video cable 106.

Display device 104 includes a video consumer 124, a digital audio consumer 126, a DDC/CI communications capability 128, and a switch 130. Switch 130 may be controlled by a control unit such as control unit 132, and is configured to couple pin or wire 118 of video cable 106 from connector 134 either to digital audio consumer 126 or to a non-audio conventional connection 136. As was the case in source unit 102, convention connection 136 may be whichever connection is specified for pin or wire 118 by the standard that defines video cable 106. Control unit 132 is preferably configured to switch pin or wire 118 from conventional connection 136 to digital audio consumer 126 responsive to a DDC/CI command received from source unit 102 over DDC/CI channel 138 of video cable 106.

After source unit 102 has switched pin or wire 118 from conventional connection 122 to digital audio source 110, and display device 104 has switched pin or wire 118 from conventional connection 136 to digital audio consumer 126, then digital audio may be transmitted continuously over pin or wire 118 from source unit 102 to display device 104 while analog or digital video is simultaneously transmitted from source unit 102 to display device 104 over a different set of pins or wires comprising channel 140 of video cable 106. Alternatively, source unit 102 may switch pin or wire 118 to conventional connection 122 to be operational with a standard display device that does not have the inventive features of display device 104. Similarly, display device 104 may switch pin or wire 118 to conventional connection 136 to be operational with a standard source unit that does not have the inventive features of source unit 102.

FIG. 2 illustrates a method 200 for providing audio over a standard video cable in a manner consistent with the just-described system 100. In step 202, display device 104 may initialize itself in a default mode. In the default mode, switch 130 connects pin or wire 118 from connector 134 to conventional connection 136 so that the display device would be compatible with a standard source unit. In step 204, source unit 102 may then request a DDC/CI capabilities string from display device 104 using DDC/CI channel 138 of video cable 106. Steps 206-210 illustrate that, if either one of the display device or source unit is not able to support redefinition of pin or wire 118 for audio use, then the source unit and display device may make conventional use of video cable 106. For example, in step 210, source unit 102 may use information provided by display device 104 in the capabilities string to determine whether display device 104 includes the features necessary to redefine non-audio pin or wire 118 for audio use. (A standard display device without the inventive features of display device 104 would respond to the capabilities string request of step 204 with a capabilities string that does not include a command for operating switch 130.) If source unit 102 determines that the display device does not support redefinition of pin or wire 118, then it may leave pin or wire 118 connected to conventional connection 122 as shown in step 208.

If source unit 102 determines from the capabilities string that display device 104 does support redefinition of pin or wire 118 for audio use, then it may send a DDC/CI command to the display device in step 212 to enable pin-redefined audio. In step 214, display device 104 responds to the DDC/CI command of step 212 by controlling switch 130 so that it connects pin or wire 118 to audio consumer 126. In step 216, source unit 102 controls switch 114 so that it connects pin or wire 118 to digital audio source 110. At that point, in step 218, source unit 102 may send, and display device 104 may receive, digital audio signals over redefined pin or wire 118. Simultaneously, analog or digital video signals may be transmitted from source unit 102 to display device 104 over separate wires in cable 106 comprising video channel 140.

Source unit 102 may take a wide variety of forms. For example, source unit 102 may be a personal computer or a media box in an entertainment system. And video cable 106 may also take a variety of standard forms. For example, video cable 106 and connectors 120, 134 may be compliant with a VGA standard, a DVI standard or an HDMI standard. The inventors hereof have determined that, if a VGA cable is used, pin or wire 118 may correspond to conventionally non-audio pins 4 or 111 of the VGA cable. If a DVI cable is used, pin or wire 118 may correspond to conventionally non-audio pin 8 of the DVI cable. If an HDMI cable is used, pin or wire 118 may correspond to conventionally non-audio pin 14 of the HDMI cable. In addition or in the alternative, pin or wire 118 may correspond to a CEC line of a standard video cable. Digital audio source 110 and consumer 126 may also take a variety of forms. In one preferred embodiment, source 110 and consumer 126 may use the well-known S/PDIF digital audio format.

While the invention has been described in detail with reference to preferred embodiments thereof, the described embodiments have been presented by way of example and not by way of limitation. It will be understood by those skilled in the art that various changes may be made in the form and details of the described embodiments without deviating from the spirit and scope of the invention as defined by the appended claims.

What is claimed is:

1. A system for providing audio over a standard video cable, comprising:
   a source unit having a video source, a digital audio source, a source DDC/CI communications capability and a first switch for coupling a pin of a standard video cable connector in the source unit either to the digital audio source or to a first non-audio conventional connection; and
   a display device having a video consumer, a digital audio consumer, a display device DDC/CI communications capability and a second switch for coupling a pin of a standard video cable connector in the display device either to the digital audio consumer or to a second non-audio conventional connection, wherein the switch is responsive to a DDC/CI command received from the source unit.

2. The system of claim 1, wherein:
   the standard video cable connectors in the source unit and display device are VGA connectors.

3. The system of claim 2, wherein:
   the pin coupled to the first switch and the pin coupled to the second switch correspond to pin 4 of the VGA connectors.

4. The system of claim 2, wherein:
   the pin coupled to the first switch and the pin coupled to the second switch correspond to pin 11 of the VGA connectors.

5. The system of claim 1, wherein:
   the standard video cable connectors in the source unit and display device are DVI connectors.

6. The system of claim 5, wherein:
the pin coupled to the first switch and the pin coupled to the second switch correspond to pin 8 of the DVI connectors.

7. The system of claim 1, wherein:
the standard video cable connectors in the source unit and display device are HDMI connectors.

8. The system of claim 7, wherein:
the pin coupled to the first switch and the pin coupled to the second switch correspond to pin 14 of the HDMI connectors.

9. The system of claim 1, wherein:
the pin coupled to the first switch and the pin coupled to the second switch correspond to a CEC line in the standard video cable.

10. The system of claim 1, wherein the source unit is a personal computer.

11. The system of claim 1, wherein the source unit is a media box.

12. The system of claim 1, wherein:
the digital audio source and the digital audio consumer use the S/PDIF format.

13. A method of providing audio over a standard video cable, comprising:
in a source unit, connecting a wire of the standard video cable to a first non-audio conventional connection;
in a display device, connecting the wire to a second non-audio conventional connection;
in the source unit, sending a DDC/CI command to the display device;
in the display device, switching the wire from the second non-audio conventional connection to a digital audio consumer responsive to the DDC/CI command;
in the source unit, switching the wire from the first non-audio conventional connection to a digital audio source.

14. The method of claim 13, further comprising:
in the source unit, and prior to sending the DDC/CI command to switch the wire from the second non-audio conventional connection in the display device, requesting a DDC/CI capabilities string from the display device and determining from information in the capabilities string that the display device is capable of receiving digital audio over the wire.

15. A system for providing audio over a standard video cable, comprising:
means in a source unit for determining whether a display device supports redefining a conventionally non-audio pin or wire of the standard video cable for audio use;
means in the source unit for sending a command to the display device to enable reception using the conventionally non-audio pin or wire;
means in the display device for switching the conventionally non-audio pin or wire from a conventional connection to a digital audio consumer responsive to the command; and
means in the source unit for transmitting digital audio over the conventionally non-audio pin or wire.

* * * * *